United States Patent
Hao et al.

(10) Patent No.: US 9,647,959 B2
(45) Date of Patent: May 9, 2017

(54) METHOD, DEVICE, AND SYSTEM FOR CREATING BIDIRECTIONAL MULTICAST DISTRIBUTION TREE BASED ON INTERIOR GATEWAY PROTOCOL

(71) Applicant: Huawei Technologies Co., Ltd., Shenzhen (CN)

(72) Inventors: Weiguo Hao, Shenzhen (CN); Zhenbin Li, Shenzhen (CN); Yisong Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 64 days.

(21) Appl. No.: 14/594,864

(22) Filed: Jan. 12, 2015

(65) Prior Publication Data
US 2015/0124810 A1 May 7, 2015

Related U.S. Application Data

(63) Continuation of application No. PCT/CN2013/078659, filed on Jul. 2, 2013.

(30) Foreign Application Priority Data

Jul. 12, 2012 (CN) .......................... 2012 1 0241161

(51) Int. Cl.
*H04L 12/18* (2006.01)
*H04L 12/931* (2013.01)
(Continued)

(52) U.S. Cl.
CPC .......... *H04L 49/201* (2013.01); *H04L 12/185* (2013.01); *H04L 45/16* (2013.01); *H04L 61/2069* (2013.01)

(58) Field of Classification Search
None
See application file for complete search history.

(56) References Cited

U.S. PATENT DOCUMENTS

| 2005/0025072 A1* | 2/2005 | Okada | H04L 45/54 |
| | | | 370/256 |
| 2006/0262792 A1* | 11/2006 | Rokui | H04L 12/185 |
| | | | 370/390 |

(Continued)

FOREIGN PATENT DOCUMENTS

| CN | 101083664 A | 12/2007 |
| CN | 101163103 A | 4/2008 |

(Continued)

OTHER PUBLICATIONS

Kumar et al., "The MASC/BGMP Architecture for Inter-domain Multicast Routing," Proceedings of the ACM SIGCOMM '98 Conference on Applications, Technologies, Architectures and Protocols for Computer Communication, pp. 93-104, ACM, New York, New York (Oct. 1, 1998).

(Continued)

*Primary Examiner* — Kibrom T Hailu
*Assistant Examiner* — Bao G Nguyen
(74) *Attorney, Agent, or Firm* — Leydig, Voit & Mayer, Ltd

(57) ABSTRACT

Embodiments of the present invention provide a method, a device, and a system for creating a bidirectional multicast distribution tree based on an interior gateway protocol, the method includes: generating, according to a root address of a first node flooded by the first node through an IGP and a shortest path tree algorithm, a shortest path to another node with the first node as a source node, and constructing a flooding tree according to the shortest path; and when receiving layer 3 multicast group information flooded by an edge node, determining, according to the layer 3 multicast (Continued)

group information and a multicast group range that is supported by the first node, a flooding tree corresponding to each layer 3 multicast group, and performing pruning, according to the layer 3 multicast group information, to the flooding tree corresponding to each layer 3 multicast group, to generate a bidirectional multicast distribution tree.

18 Claims, 11 Drawing Sheets

(51) Int. Cl.
*H04L 12/761* (2013.01)
*H04L 29/12* (2006.01)

(56) References Cited

U.S. PATENT DOCUMENTS

| | | | |
|---|---|---|---|
| 2007/0177525 A1* | 8/2007 | Wijnands | H04L 12/18 370/254 |
| 2008/0089335 A1 | 4/2008 | Li et al. | |
| 2009/0168768 A1* | 7/2009 | Chiabaut | H04L 45/00 370/389 |
| 2012/0207159 A1* | 8/2012 | Buchko | H04L 45/16 370/390 |
| 2015/0124810 A1* | 5/2015 | Hao | H04L 45/16 370/390 |

FOREIGN PATENT DOCUMENTS

CN    102142970 A    8/2011
WO    WO 2012042440 A2    4/2012

OTHER PUBLICATIONS

Ramalho et al., "Intra- and Inter-Domain Multicast Routing Protocols: A Survey and Taxonomy," IEEE Communications Surveys & Tutorials, vol. 3, Issue 1, pp. 2-25, Institute of Electrical and Electronics Engineers, New York, New York (First Quarter 2000).
Lu et al., "Transport of Fast Notification Messages," Network Working Group, Internet-Draft, pp. 1-23, IETF Trust, Reston, Virginia (Jul. 11, 2011).

* cited by examiner

METHOD, DEVICE, AND SYSTEM FOR CREATING BIDIRECTIONAL MULTICAST DISTRIBUTION TREE BASED ON INTERIOR GATEWAY PROTOCOL

CROSS-REFERENCE TO RELATED APPLICATIONS

This application is a continuation of International Patent Application No. PCT/CN2013/078659, filed on Jul. 2, 2013, which claims priority to Chinese Patent Application No. 201210241161.0, filed on Jul. 12, 2012, both of which are hereby incorporated by reference in their entireties.

TECHNICAL FIELD

The present invention relates to the field of communication technologies, and in particular, to a method, a device, and a system for creating a bidirectional multicast distribution tree based on an interior gateway protocol.

BACKGROUND

There are a lot of application scenarios of multipoint to multipoint multicast in the current network, and the application scenarios of multipoint to multipoint multicast are to bear a broadcast packet in a layer 2 virtual local area network (Virtual Local Area Network, VLAN for short) onto a corresponding layer 3 multicast group via overlay (Overlay) technology, and emulate multipoint to multipoint local area network applications in the layer 2 VLAN such as unknown unicast flooding, broadcast and etc. through a layer 3 multicast group distribution tree. In a multipoint to multipoint multicast scenario, each edge router is connected both to a multicast source and to a receiver, under this scenario, it is more suitable to adopt a bidirectional multicast distribution tree, where a multicast data packet can be sent from a leaf to a root, and also can be sent from a root to a leaf. Currently, a bidirectional multicast distribution tree in a network is usually constructed by a bidirectional protocol independent multicast (Protocol Independent Multicast, PIM for short).

During implementation of embodiments of the present invention, an inventor founds that at least following problems are existed in the prior art: in the multipoint to multipoint multicast scenario, the bidirectional PIM protocol is adopted when multicast needs to be implemented, and at the mean time, an interior gateway protocol (Interior Gateway Protocol, IGP for short) needs to be run as a unicast routing protocol, so two sets of protocols need to be operated and maintained simultaneously, and the operation and maintenance are complex.

SUMMARY

Embodiments of the present invention provide a method, a device, and a system for creating a bidirectional multicast distribution tree based on an interior gateway protocol, in order to solve the problem that two sets of protocols of an IGP unicast routing protocol and a PIM multicast routing protocol need to be operated and maintained simultaneously in the multipoint to multipoint multicast scenario and the operation and maintenance are complex.

To achieve the above objective, the embodiments of the present invention use the following technical solutions:

In one aspect, a method for creating a bidirectional multicast distribution tree based on an IGP is provided, including:

receiving a root address of a first node and a multicast group range that is supported by the first node, which are flooded by at least one first node through the IGP, where the first node is a node which is taken as a root of a flooding tree (Flooding Tree) of an entire network; generating, according to the root address of the first node and a shortest path tree algorithm, a shortest path to another node with the first node as a source node, and constructing the flooding tree according to the shortest path; and when receiving layer 3 multicast group information flooded by an edge node through the IGP, determining, according to the layer 3 multicast group information and the multicast group range that is supported by the first node, a flooding tree corresponding to each layer 3 multicast group, and performing pruning, according to the layer 3 multicast group information, to the flooding tree corresponding to each layer 3 multicast group, to generate a bidirectional multicast distribution tree.

Further, optionally, after the generating, according to the root address of the first node and a shortest path tree algorithm, a shortest path to another node with the first node as a source node, and constructing the flooding tree according to the shortest path, further including: if a branch or a leaf node of the flooding tree has multiple parent nodes which reach the first node, selecting, according to attributes of the multiple parent nodes, one single node from the multiple parent nodes as a parent node for the branch or the leaf node to reach the first node.

Further, optionally, when the IGP is an intermediate system to intermediate system routing selection protocol (Intermediate System to Intermediate System Routing Protocol, IS-IS for short), an attribute of the parent node includes a system ID. When the IGP is an open shortest path first (Open Shortest Path First, OSPF for short) protocol, an attribute of the parent node includes a router ID.

Further, optionally, after the generating, according to the root address of the first node and a shortest path tree algorithm, a shortest path to another node with the first node as a source node and constructing the flooding tree according to the shortest path, further including: if there are multiple parallel links between two nodes of the flooding tree, selecting, according to attributes of the multiple parallel links, one single link from the multiple parallel links as a link between the two nodes.

Further, optionally, when the IGP is IS-IS, an attribute of the parallel link includes a circuit ID or a pseudo node ID. When the IGP is an OSPF protocol, an attribute of the parallel link includes an IP address of an interface.

Further, optionally, the multicast group range supported by the first node includes a multicast IP address of the first node and a mask corresponding to the multicast IP address, and the determining, according to the layer 3 multicast group information and the multicast group range that is supported by the first node, a flooding tree corresponding to each layer 3 multicast group, includes: selecting, according to the layer 3 multicast group information and a multicast IP address range that is carried by the first node, a corresponding first node for the layer 3 multicast group; if there are multiple first nodes covering a same multicast group, selecting, according to masks carried by the multiple first nodes, a first node with a longest mask from the multiple first nodes as the corresponding first node of the layer 3 multicast group covered by the multiple first nodes; and if there are multiple first nodes with the longest mask, using a HASH algorithm to select one single node from the multiple first nodes with the longest mask as the corresponding first node of the layer 3 multicast group covered by the multiple first nodes with the longest mask.

Further, optionally, the performing pruning, according to the layer 3 multicast group information, to the flooding tree corresponding to the each layer 3 multicast group, includes: generating a corresponding out interface list of a local node according to the flooding tree; traversing, according to the each layer 3 multicast group corresponding to the flooding tree, a node connected to each out interface in the out interface list; if both the node connected to the out interface and all node on a branch through which the node connected to the out interface recurses to a leaf node are not the edge node which advertises multicast group information, then deleting out interface information of the out interface from the out interface list; and after completing traversing all the nodes connected to all the out interfaces in the out interface list, if there is only an out interface, which is connected to an upstream node, left in the out interface list, and the local node is not the edge node which advertises the multicast group information either, not generating a multicast forwarding table corresponding to the layer 3 multicast group, otherwise generating the multicast forwarding table corresponding to the layer 3 multicast group according to the out interface list after traversing.

In another aspect, a device for creating a bidirectional multicast distribution tree based on an IGP is also provided, including:

a first receiving unit, configured to receive a root address of a first node and a multicast group range that is supported by the first node, which are flooded by at least one first node through the IGP, where the first node is a node which is taken as a root of a flooding tree of an entire network;

a first creating unit, configured to generate, according to the root address of the first node received by the first receiving unit and a shortest path tree algorithm, a shortest path to another node with the first node as a source node, and construct a flooding tree according to the shortest path;

a second receiving unit, configured to receive layer 3 multicast group information flooded by an edge node through the IGP;

a determining unit, configured to, when the second receiving unit receives the layer 3 multicast group information flooded by the edge node through the IGP, determine, according to the layer 3 multicast group information and the multicast group range supported by the first node which is received by the first receiving unit, a flooding tree corresponding to each layer 3 multicast group; and a pruning unit, configured to perform pruning, according to the layer 3 multicast group information, to the flooding tree corresponding to each layer 3 multicast group determined by the determining unit, to generate a bidirectional multicast distribution tree.

Further, optionally, the device for creating a bidirectional multicast distribution tree based on an IGP, further includes:

a first selecting unit, configured to, if a branch or a leaf node of the flooding tree created by the first creating unit has multiple parent nodes which reach the first node, select, according to attributes of the multiple parent nodes, one single node from the multiple parent nodes as a parent node for the branch or the leaf node to reach the first node.

Further, optionally, when the IGP is IS-IS, an attribute of the parent node includes a system ID. When the IGP is an OSPF protocol, an attribute of the parent node includes a router ID.

Further, optionally, the device for creating a bidirectional multicast distribution tree based on an IGP, further includes:

a second selecting unit, configured to, if there are multiple parallel links between two nodes of the flooding tree created by the first creating unit, select, according to attributes of the multiple parallel links, one single link from the multiple parallel links as a link between the two nodes.

Further, optionally, when the IGP is the IS-IS, an attribute of the parallel link includes a circuit ID or a pseudo node ID. When the IGP is the OSPF protocol, an attribute of the parallel link includes an IP address of an interface.

Further, optionally, the determining unit includes:

a first selecting subunit, configured to select, according to the layer 3 multicast group information and a multicast IP address range that is carried by the first node, a corresponding first node for the layer 3 multicast group;

a second selecting subunit, configured to, if the first selecting subunit selects and obtains multiple first nodes covering a same multicast group, select, according to masks carried by the multiple first nodes, a first node with a longest mask from the multiple first nodes as the corresponding first node of the layer 3 multicast group covered by the multiple first nodes; and a third selecting subunit, configured to, if the second selecting subunit selects and obtains multiple first nodes with the longest mask, use a HASH algorithm to select one single node from the multiple first nodes with the longest mask as the corresponding first node of the layer 3 multicast group covered by the multiple first nodes with longest mask.

Further, optionally, the pruning unit includes:

a first generating subunit, configured to generate a corresponding out interface list of a local node according to the flooding tree;

a traversing subunit, configured to traverse, according to the each layer 3 multicast group corresponding to the flooding tree, a node connected to each out interface in the out interface list;

a deleting subunit, configured to, if both the node connected to the out interface and all node on a branch through which the node connected to the out interface recurses to a leaf node are not the edge node which advertises multicast group information, delete out interface information of the out interface from the out interface list; and a generating subunit, configured to, after completing traversing all the nodes connected to all the out interfaces in the out interface list, if there is only an out interface, which is connected to an upstream node, left in the out interface list, and the local node is not the edge node which advertises the multicast group information either, not generate a multicast forwarding table corresponding to the layer 3 multicast group, otherwise generate the multicast forwarding table corresponding to the layer 3 multicast group according to the out interface list after traversing.

In still another aspect, a system for creating a bidirectional multicast distribution tree based on an IGP is also provided, including:

a first node, configured to flood, through the IGP, a root address of the first node and a multicast group range that is supported by the first node, where the first node is a node which is taken as a root of a flooding tree of an entire network;

an edge node, configured to flood, through the IGP, layer 3 multicast group information;

a normal node, configured to receive the root address of the first node and the multicast group range that is supported by the first node, which are flooded by at least one first node, generate, according to the root address of the first node and a shortest path tree algorithm, a shortest path to another node with the first node as a source node, and construct the flooding tree according to the shortest path;

where the normal node is further configured to, when receiving the layer 3 multicast group information flooded by the edge node, determine, according to the layer 3 multicast group information and the multicast group range that is supported by the first node, a flooding tree corresponding to each layer 3 multicast group, and perform pruning, according to the layer 3 multicast group information, to the flooding tree corresponding to each layer 3 multicast group, to generate a bidirectional multicast distribution tree.

The method, device and system for creating a bidirectional multicast distribution tree based on an interior gateway protocol, which are provided by the embodiments of the present invention, generate, according to a root address of a first node flooded by the first node through an IGP and an shortest path tree algorithm, a shortest path to another node with the first node as a source node, construct a flooding tree according to the shortest path, and when receiving layer 3 multicast group information flooded by an edge node through the IGP, determine, according to the layer 3 multicast group information and a multicast group range that is supported by the first node, a flooding tree corresponding to each layer 3 multicast group, and perform pruning, according to the layer 3 multicast group information, to the flooding tree corresponding to each layer 3 multicast group, to generate a bidirectional multicast distribution tree, and achieve creating a bidirectional multicast distribution tree based on the IGP, and make it possible that in the multipoint to multipoint multicast scenario, whether multicast or unicast needs to be implemented, IGP is adopted for both, simplify the operation and maintenance of the protocol, and solve the problem in the prior art that two sets of protocols which are an IGP unicast routing protocol and a PIM multicast routing protocol need to be operated and maintained simultaneously in the multipoint to multipoint multicast scenario and the operation and maintenance are complex.

DESCRIPTION OF EMBODIMENTS

In order to solve the problem in the prior art that two sets of protocols which are an IGP unicast routing protocol and a PIM multicast routing protocol need to be operated and maintained simultaneously in the multipoint to multipoint multicast scenario and the operation and maintenance are complex, embodiments of the present invention provides a method, a device, and a system for creating a bidirectional multicast distribution tree based on an IGP.

Embodiment 1

Figure 1A:
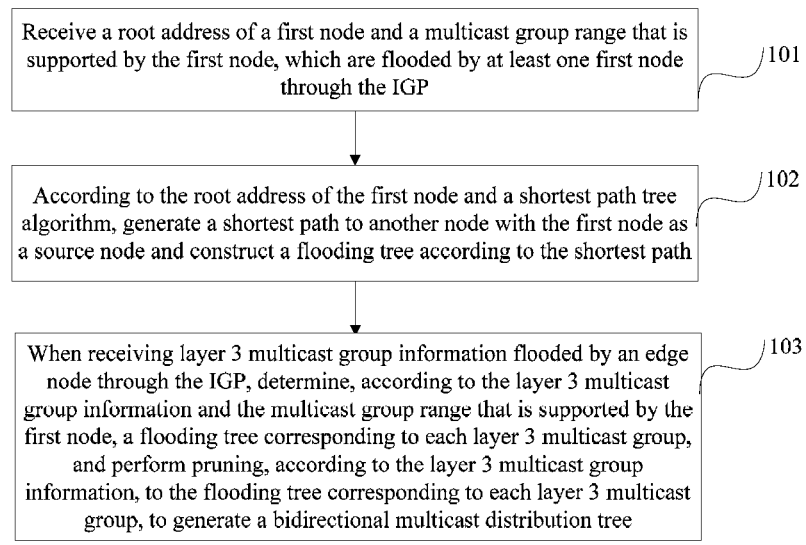
FIG. 1(a) is a first flowchart of a method for creating a bidirectional multicast distribution tree based on an IGP according to a first embodiment of the present invention.

As shown in FIG. 1(a), an embodiment of the present invention provides a method for creating a bidirectional multicast distribution tree based on an IGP, and in this embodiment, which may be applied to all nodes in an entire network, the method includes:

101. Receive a root address of a first node and a multicast group range that is supported by the first node, which are flooded by at least one first node through the IGP.

The first node is a node which is taken as a root of a flooding tree of the entire network. The root address of the first node and the multicast group range that is supported by the first node may be preconfigured, in this embodiment, each first node is at least configured with an IP address, and the IP address is the root address. Certainly, the multicast group range supported by the first node may also be automatically configured by the first node according to an attribute of the first node itself, which will not be limited hereby.

It should be noted that the root address of the first node and the multicast group range that is supported by the first node may be encapsulated in one piece of configuration information simultaneously, and may be encapsulated respectively, and then be flooded respectively, which will not be limited hereby.

102. According to the root address of the first node and a shortest path tree (Shortest Path Tree, SPT for short) algorithm, generate a shortest path to another node with the first node as a source node, and construct a flooding tree according to the shortest path.

103. When receiving layer 3 multicast group information flooded by an edge node through the IGP, determine, according to the layer 3 multicast group information and the multicast group range that is supported by the first node, a flooding tree corresponding to each layer 3 multicast group, and perform pruning, according to the layer 3 multicast group information, to the flooding tree corresponding to each layer 3 multicast group, to generate a bidirectional multicast distribution tree.

It should be noted that, as each node independently calculates, on the basis of the first node, a shortest path to another node with the first node as the source node, each node has a uniform topology of the entire network and uses a same algorithm, and thus all nodes have a consistent understanding about a form of a shortest path tree. In such way, compared with the PIM network in the prior art where nodes on the bidirectional multicast distribution tree need to periodically send Join or Prune messages to the upstream, the method provided in the embodiments of the present invention does not need the Join or Prune messages in the PIM network, and can also generate shortest path tree information with the first node as a root to construct the flooding tree, and further generate a corresponding bidirectional multicast distribution tree by pruning, which reduces a processing load on the CPU.

Figure 1B:
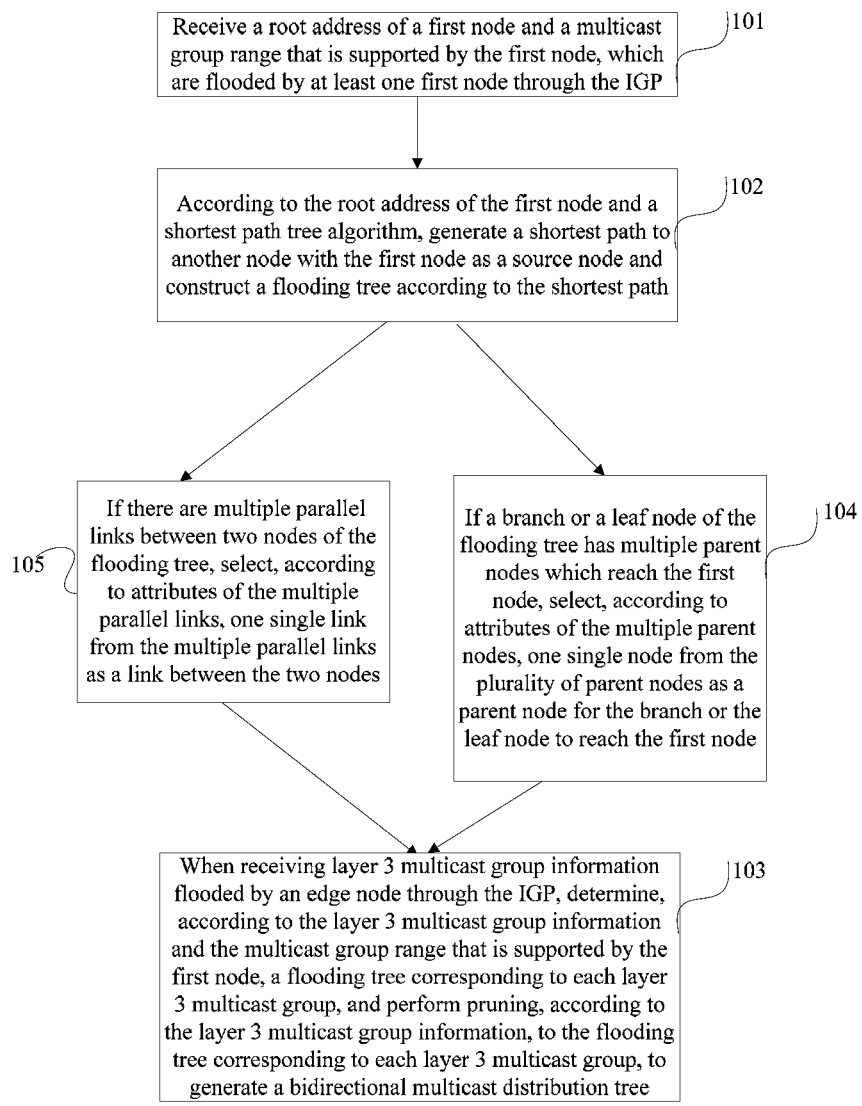
FIG. 1(b) is a second flowchart of the method for creating a bidirectional multicast distribution tree based on an IGP according to the first embodiment of the present invention.

As shown in FIG. 1(b), further, in order to avoid that a same multicast group packet is sent to the first node repeatedly, after generating, according to the root address of the first node and the shortest path tree algorithm, the shortest path to another node with the first node as a source node and constructing the flooding tree according to the shortest path, further includes:

104. If a branch or a leaf node of the flooding tree has multiple parent nodes which reach the first node, select, according to attributes of the multiple parent nodes, one single node from the multiple parent nodes as a parent node for the branch or the leaf node to reach the first node.

The leaf node is the most bottom node of a tree, and the leaf node has no child node.

It should be noted that for different IGPs, corresponding attributes of a parent node are different, for example, when the IGP is IS-IS, the attribute of the parent node may include a system ID; when the IGP is an OSPF protocol, the attribute of the parent node may include a router ID, certainly there are other IGPs, to which the method may be applied, and it will not be enumerated hereby.

As shown in FIG. 1(b), further, to avoid that a same multicast group packet is sent to one node repeatedly, after generating, according to the root address of the first node and the shortest path tree algorithm, the shortest path to another node with the first node as a source node and constructing the flooding tree according to the shortest path, further includes:

105. If there are multiple parallel links between two nodes of the flooding tree, select, according to attributes of the multiple parallel links, one single link from the multiple parallel links as a link between the two nodes.

It should be noted that for different IGPs, corresponding attributes of a parallel link is different, for example, when the IGP is IS-IS, the attribute of the parallel link may include a circuit ID (Circuit ID) or a pseudo node ID (Pseudonode ID); when the IGP is an OSPF protocol, the attribute of the parallel link may include an IP address of an interface, certainly there are other IGPs, to which the method may be applied, and it will not be enumerated hereby.

The method for creating a bidirectional multicast distribution tree based on an interior gateway protocol provided by the embodiments of the present invention is to, generate, according to a root address of a first node flooded by each first node through an IGP and a shortest path tree algorithm, a shortest path to another node with the first node as a source node, and construct a flooding tree according to the shortest path, and when receiving layer 3 multicast group information flooded by an edge node through the IGP, determine, according to the layer 3 multicast group information and the multicast group range that is supported by the first node, a flooding tree corresponding to each layer 3 multicast group, and perform pruning, according to the layer 3 multicast group information, to the flooding tree corresponding to each layer 3 multicast group, to generate a bidirectional multicast distribution tree, and achieves creating a bidirectional multicast distribution tree based on the IGP, so that in the multipoint to multipoint multicast scenario, no matter whether multicast or unicast needs to be implemented, the IGP is adopted for the both, simplifies the operation and maintenance of a protocol, and solves the problem in the prior art that two sets of protocols which are an IGP unicast routing protocol and a PIM multicast routing protocol need to be operated and maintained simultaneously in the multipoint to multipoint multicast scenario and the operation and maintenance are complex.

In order for the persons skilled in the art to be able to understand the technical solutions provided in the embodiments of the present invention more clearly, the method for creating a bidirectional multicast distribution tree based on an interior gateway protocol provided by the embodiments of the present invention is described in detail in the following through specific embodiments.

Embodiment 2

Figure 2:
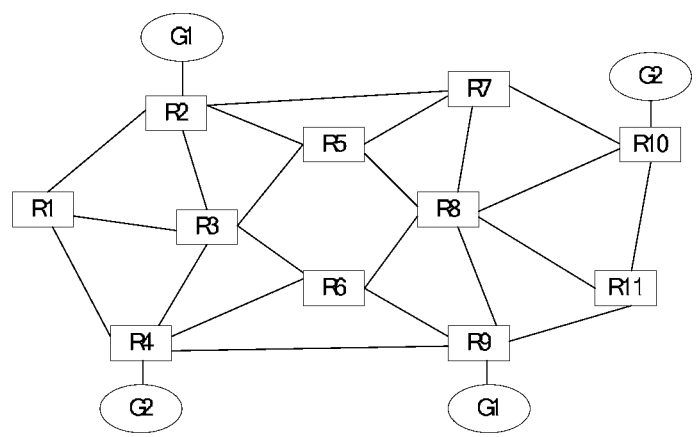
FIG. 2(a) is a network architecture diagram of a multipoint to multipoint multicast scenario according to a second embodiment of the present invention.
FIG. 2(b) is a flowchart of a method for creating a bidirectional multicast distribution tree based on an IGP according to the second embodiment of the present invention.
FIG. 2(c) is a flooding tree with R1 as a root according to the second embodiment of the present invention.
FIG. 2(d) is a flooding tree with R2 as a root according to the second embodiment of the present invention.
FIG. 2(e) is two bidirectional multicast distribution trees constructed by two second nodes RP1 and RP2 when constructing bidirectional multicast distribution trees, according to the second embodiment of the present invention.
FIG. 2(f) is a first bidirectional multicast distribution tree in FIG. 2 (e)
FIG. 2(g) is a second bidirectional multicast distribution tree in FIG. 2 (e)
FIG. 2(h) is a first method flowchart of step 206 in the method for creating a bidirectional multicast distribution tree based on an IGP as shown in FIG. 2 (b)
FIG. 2(i) is a second method flowchart of step 206 in the method for creating a bidirectional multicast distribution tree based on an IGP as shown in FIG. 2 (b)
Figure 2B:
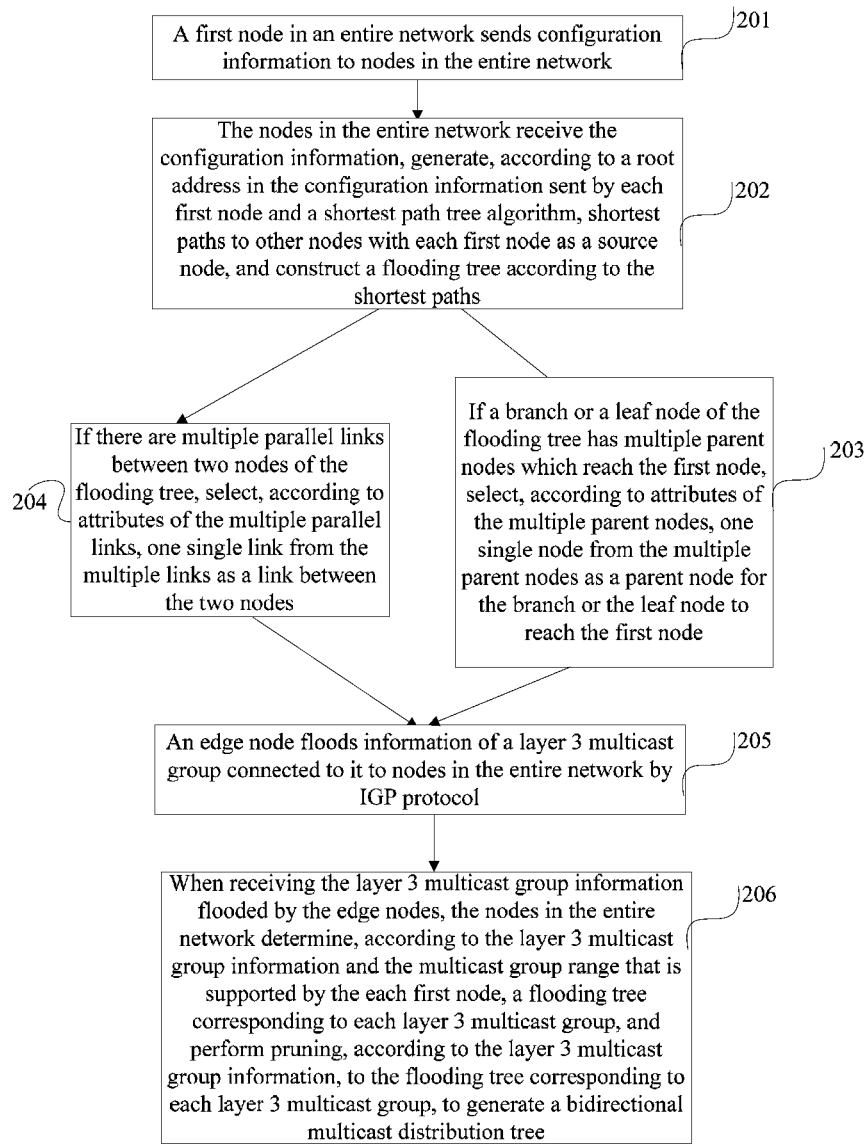

A method for creating a bidirectional multicast distribution tree based on an IGP according to another embodiment of the present invention, is applied in a multipoint to multipoint multicast scenario, as shown in FIG. 2 (a), which is a schematic network architecture diagram of a multipoint to multipoint multicast scenario, and an entire network includes multiple nodes (R1~R11), where a terminal of layer 3 multicast group G1 is attached under edge nodes R2 and R9, and a terminal of layer 3 multicast group G2 is attached under edge nodes R4 and R10; and where R1, R3, R7, and R8 are first nodes. As shown in FIG. 2(b), the method for creating a bidirectional multicast distribution tree based on an IGP includes:

201. A first node in an entire network sends configuration information to nodes in the entire network.

The first node is a node which is taken as a root of a flooding tree in the entire network.

In this embodiment, the configuration information includes a root address of the first node and a multicast group range that is supported by the first node.

Specifically, R1 floods configuration information of itself to R2~R11 in the entire network; R3 floods configuration information of itself to R1, R2, and R4~R11 in the entire network; R7 floods configuration information of itself to R1~R6, and R8~R11 in the entire network; and R8 floods configuration information of itself to R1~R7, and R9~R11 in the entire network.

202. The nodes in the entire network receive the configuration information, generate, according to a root address in the configuration information sent by each first node and a shortest path tree algorithm, shortest paths to other nodes with each first node as a source node, and construct a flooding tree according to the shortest paths.

If there are multiple flooding trees, then the trees are ordered according to values of root IP addresses of the flooding trees, and for example, if there are n flooding trees, then the trees are numbered from 1 to n.

Here, taking R1 and R7 as examples to make description in detail.

If a root IP address of R1 is smaller than a root IP address of R7, then the flooding tree with R1 as the root is a first tree, and the flooding tree with R7 as the root is a second tree.

Figure 2C:
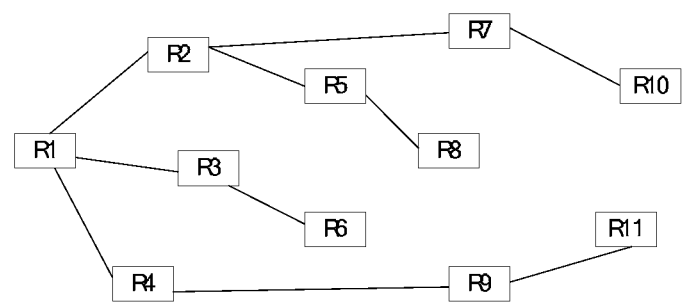

Taking R1 as a source node, as shown in FIG. 2(c), shortest paths of R1 to other nodes are generated, and a first bidirectional multicast distribution tree is constructed—the root is R1, and the first bidirectional multicast distribution tree is composed of the following paths: R1-R4-R9-R11; R1-R3-R6; R1-R2-R7-R10; R1-R2-R5-R8.

Figure 2D:
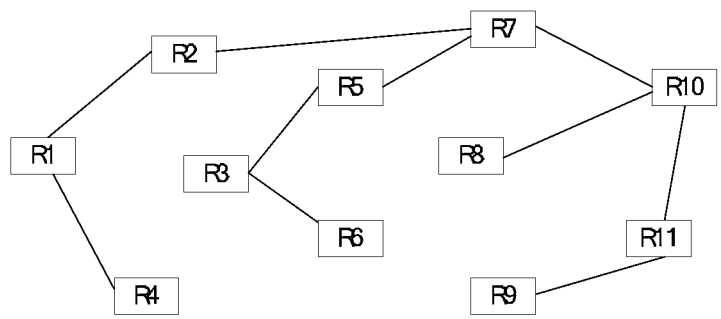

Taking R7 as a source node, as shown in FIG. 2(d), shortest paths of R7 to other nodes are generated, and a second bidirectional multicast distribution tree is constructed—the root is R7, and the second bidirectional multicast distribution tree is composed of the following paths: R7-R2-R1-R4; R7-R5-R3-R6; R7-R10-R8; R7-R10-R11-R9.

203. If a branch or a leaf node of the flooding tree has multiple parent nodes which reach the first node, select, according to attributes of the multiple parent nodes, one single node from the multiple parent nodes as a parent node for the branch or the leaf node to reach the first node.

It should be noted that, for different IGPs, corresponding attributes of a parent node are different, for example, when the IGP is IS-IS, the attribute of the parent node may include a system ID; when the IGP is an OSPF protocol, the attribute of the parent node may include a router ID, certainly there are other IGPs, to which the method may be applied, and it will not be enumerated hereby.

In this embodiment, the IGP being IS-IS is taken as an example for detailed illustration, the attribute of the parent node may be a system ID, and the number of the multiple parent nodes is K, and the selecting, according to attributes of the multiple parent nodes, one single node from the multiple parent nodes as a parent node for the branch or the leaf node to reach the first node, may specifically include: according to system IDs of the multiple parent nodes, ordering the multiple parent nodes, the multiple parent nodes are ordered as Parent 1, Parent 2, . . . , Parent K, and for a $J^{th}$ tree, selecting a $(J \bmod K)^{th}$ parent node.

In this embodiment, the IGP being an OSPF protocol is taken as an example for detailed illustration, the attribute of the parent node may be a router ID, and the number of the multiple parent nodes is K, and the selecting, according to attributes of the multiple parent nodes, one single node from the multiple parent nodes as a parent node for the branch or the leaf node to reach the first node, may specifically include: according to router IDs of the multiple parent nodes, ordering the multiple parent nodes, the multiple parent nodes are ordered as Parent1, Parent2 . . . Parent K, and for a $J^{th}$ tree, selecting a $(J \bmod K)^{th}$ parent node.

Figure 2E:
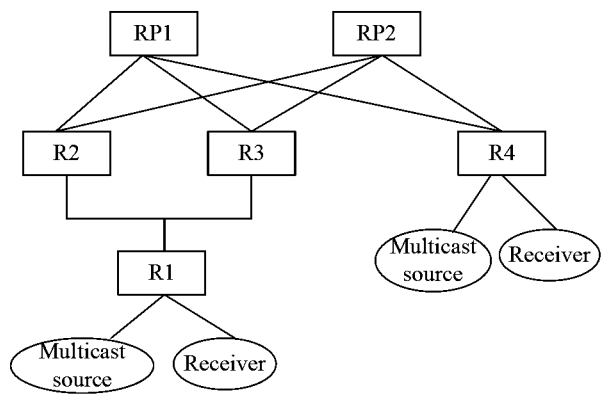
Figure 2F:
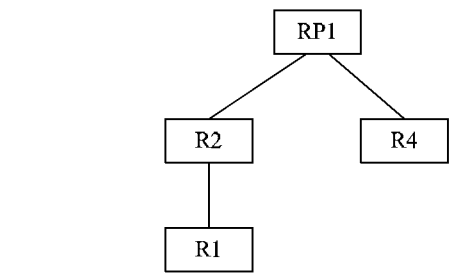
Figure 2:
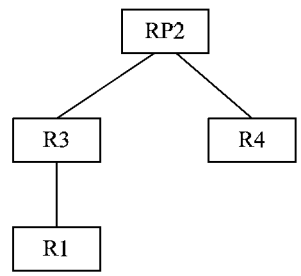
Figure 2:
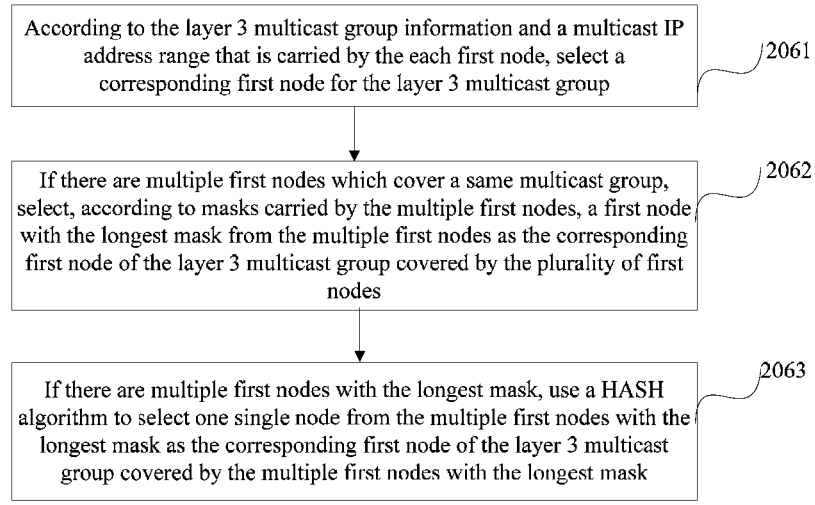

As for an example, as shown in FIG. 2(e), when two first nodes RP1 and RP2 construct flooding trees, two flooding trees are obtained. A first bidirectional multicast distribution tree is—taking RP1 as a root, and the first bidirectional multicast distribution tree is composed of the following paths: RP1-R2-R1; RP1-R3-R1; and RP1-R4. A second bidirectional multicast distribution tree is—taking RP2 as a root, and the second bidirectional multicast distribution tree is composed of the following paths: RP2-R2-R1; RP2-R3-R1; and RP2-R4. Where R1 and R4 are edge nodes, which are connected to a multicast source and a receiver, the cost of links between the nodes of the constructed flooding trees are equal, and R1 may reach RP1 via two parent nodes R2 and R3, and also may reach RP2 via two parent nodes R2 and R3. In order to avoid that a same multicast packet is sent to the first nodes RP1, RP2 repeatedly, through a calculation in step 203, select one single node as a parent node for R1 to reach RP1, and select one single node as a parent node for R1 to reach RP2, to form the first bidirectional multicast distribution tree as shown in FIG. 2(f) and the second bidirectional multicast distribution tree as shown in FIG. 2(g), where the first bidirectional multicast distribution tree takes RP1 as the root, and is composed of the following paths: RP1-R2-R1 and RP1-R4. The second bidirectional multicast distribution tree takes RP2 as the root, and is composed of the following paths RP2-R3-R1 and RP2-R4. In this way, a multicast data packet sent from R1 to RP1 can only be forwarded by R2. A multicast data packet sent from R4 to RP1 reaches R2 via RP1, only R2 (via R2-R1 interface) can send the multicast data packet to downstream flooding links, and the multicast data packet will not be sent to the downstream flooding links through R3, avoiding that R1 receives double duplicate traffic.

204. If there are multiple parallel links between two nodes of the flooding tree, select, according to attributes of the multiple parallel links, one single link from the multiple parallel links as a link between the two nodes.

It should be noted that for different IGPs, corresponding attributes of a parallel link are different, for example, when the IGP is IS-IS, the attribute of the parallel link may be a circuit ID (Circuit ID), and also may be a pseudo node ID (Pseudo node ID); when the IGP is an OSPF protocol, the attribute of the parallel link may be an IP address of an interface, certainly there are other IGPs, to which the method may be applied, and it will not be enumerated hereby.

In this embodiment, the IGP being IS-IS is taken as an example to make description in detail. The attribute of the parallel link may be a circuit ID or a pseudo node ID, and the number of the multiple parallel links is K, and the selecting, according to attributes of the multiple parallel links, one single link from the multiple parallel links as a link between the two nodes, may specifically include: according to the attributes of the multiple parallel links which may be the circuit IDs or the pseudo node IDs, ordering the multiple parallel links, the multiple parallel links are ordered as Line 1, Line 2, . . . , Line K, and for the $J^{th}$ tree, selecting a $(J \bmod K)^{th}$ parallel Link. Of course, for the OSPF protocol, the specific implementation of selecting, according to attributes of the multiple parallel links, one single link from the multiple parallel links as a link between the two nodes is similar to the aforementioned, which will not be repeated hereby.

205. An edge node floods information of a layer 3 multicast group connected to it to nodes in the entire network by the IGP.

The edge node is a node in the entire network which is connected to a multicast source and/or a receiver.

Generally, the multicast source connected to the edge node may also be a receiver at the same time, the receiver will initiate joining to a layer 3 multicast group which the receiver needs to join, through an Internet group management protocol (Internet Group Management Protocol, IGMP) packet, and the edge node may obtain layer 3 multicast group information according to the IGMP packet sent by the receiver. If the edge node is connected to a multicast source that is not a receiver, the edge node may obtain the information of the layer 3 multicast group connected to it by static configuration or by sensing a first packet of a multicast data stream sent by the multicast source.

206. When receiving the layer 3 multicast group information flooded by the edge nodes, the nodes in the entire network determine, according to the layer 3 multicast group information and the multicast group range that is supported by the each first node, a flooding tree corresponding to each layer 3 multicast group, and perform pruning, according to the layer 3 multicast group information, to the flooding tree corresponding to each layer 3 multicast group, to generate a bidirectional multicast distribution tree.

Where the multicast group range that is supported by the first node is a corresponding layer 3 multicast group pre-configured, indicating that the layer 3 multicast group can use the shortest path where the first node is located to forward multicast group data traffic. In this embodiment, the multicast group range that is supported by the first node uses a manner of group-range, where a structure of the group-range is <multicast IP address, mask>.

In this embodiment, the determining, according to the layer 3 multicast group information and the multicast group range that is supported by the each first node, a flooding tree corresponding to each layer 3 multicast group, as shown in FIG. 2(h), may specifically include:

2061. According to the layer 3 multicast group information and a multicast IP address range that is carried by the each first node, select a corresponding first node for the layer 3 multicast group.

2062. If there are multiple first nodes which cover a same multicast group, select, according to masks carried by the multiple first nodes, a first node with the longest mask from the multiple first nodes, as the corresponding first node of the layer 3 multicast group covered by the multiple first nodes.

2063. If there are multiple first nodes with the longest mask, use a HASH algorithm to select one single node from the multiple first nodes with the longest mask, as the corresponding first node of the layer 3 multicast group covered by the multiple first nodes with the longest mask.

Specifically, in this embodiment, the one with a large HASH value will be selected first, and the HASH algorithm may be:

Value$(G,M,C(i))$=(1103515245*((1103515245* $(G\&M)$+12345)XOR $C(i)$)+12345)mod $2^{31}$.

Where G is an address of a multicast group, M is a calculation mask advertised by a bootstrap router (BootStrap Router, BSR), and C(i) is a root address.

Brief description: the above mentioned algorithm is that if there are multiple group-range which cover a same multicast group, then use a first node with the long mask, if lengths of the masks are equal, then select one single first node according to the HASH algorithm. Finally, all the nodes in the entire network will select a same first node as a root for the same layer 3 multicast group.

Figure 2I:
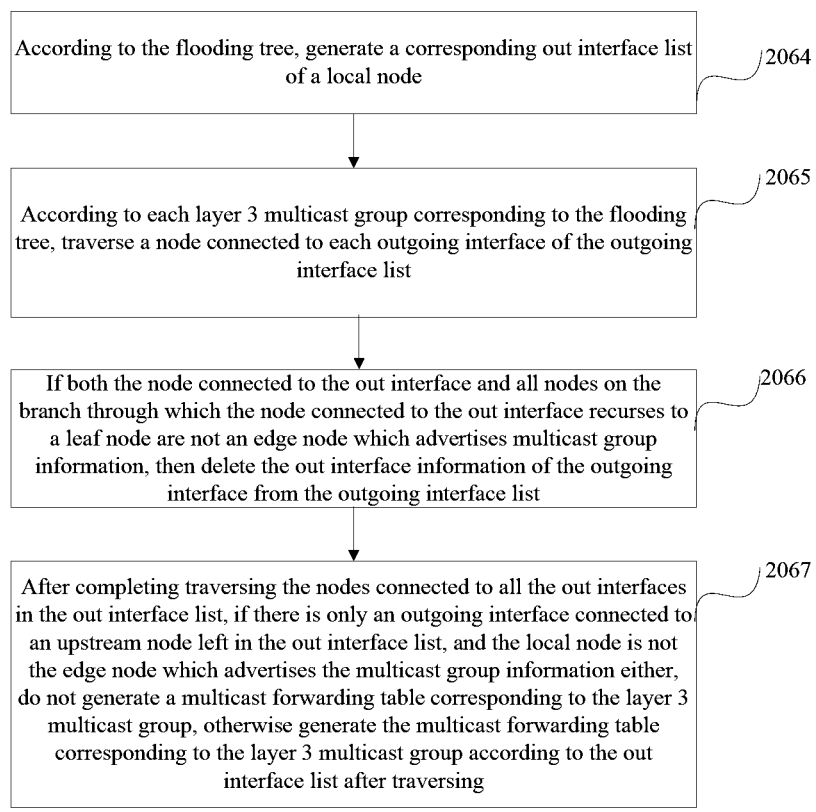

In this embodiment, the performing pruning, according to the layer 3 multicast group information, to the flooding tree corresponding to each layer 3 multicast group to generate a bidirectional multicast distribution tree, as shown in FIG. 2(i), may specifically include:

2064. According to the flooding tree, generate a corresponding out interface list of a local node.

In the this embodiment, detailed description will be given by taking the multipoint to multipoint multicast scenario as shown in FIG. 2 (a) and the flooding tree as shown in FIG. 2 (c) as an example.

Specifically, at each node of the flooding tree with R1 as the root, the corresponding out interface list of the local node is generated according to the flooding tree. For example, the out interface list generated at the node R2 is as shown in table 1, the out interface list generated at the node R4 is as shown in table 2, and the out interface list generated at the node R7 is as shown in table 3.

TABLE 1 out interface list generated at node R2

Out interface 21
Out interface 25
Out interface 27

TABLE 2 out interface list generated at node R4

Out interface 41
Out interface 49

TABLE 3 out interface list generated at node R7

Out interface 72
Out interface 710

2065. According to each layer 3 multicast group corresponding to the flooding tree, traverse a node connected to each out interface of the out interface list.

In the this embodiment, detailed description is made by taking the multipoint to multipoint multicast scenario as shown in FIG. 2 (a) and the flooding tree as shown in FIG. 2 (c) as an example.

Assuming that, according to the above mentioned step of determining, according to the layer 3 multicast group information and the multicast group range that is supported by the each first node, a flooding tree corresponding to each layer 3 multicast group, it is determined that the flooding tree corresponding to the layer 3 multicast group G1 is the flooding tree with R1 as the root, and the node R2 traverses the node connected to each out interface of the out interface list, such as R1, R5, and R7, and the node R7 traverses the node connected to each out interface of the out interface list, such as R2 and R10.

2066. If both the node connected to the out interface and all nodes on the branch through which the node connected to the out interface recurses to a leaf node are not an edge node which advertises multicast group information, then delete out interface information of the out interface from the out interface list.

In this embodiment, detailed description is given by taking the multipoint to multipoint multicast scenario as shown in FIG. 2 (a) and the flooding tree as shown in FIG. 2 (c) as an example.

With respect to the layer 3 multicast group G1, specifically, R2 traverses the following branches:

branch 1: R7-R10; branch 2: R5-R8; branch 3: R1-R3-R6; and branch 4: R1-R4-R9-R11.

Where all nodes on the above mentioned branch 1, branch 2 and branch 3 are not edge nodes which advertise the multicast group information, while R9 on branch 4 is the edge node which advertises the multicast group information, thus delete the information of the out interface connected to the node R7 and the information of the out interface connected to the node R5 from the node R2; finally, as shown in table 4, corresponding to the layer 3 multicast group G1, the out interface list at the node R2, after deleting, is the out interface 21.

TABLE 4

| the out interface list on the node R2 after traversing, which corresponds to the layer 3 multicast group G1 |
|---|
| Out interface 21 |

With respect to the layer 3 multicast group G1, specifically, R7 traverses the following branches:

branch 1: R10; branch 2: R2-R5-R8; branch 3: R2-R1-R3-R6; and branch 4: R2-R1-R4-R9-R11.

Where, all nodes on the above mentioned branch 1 are not the edge node which advertises the multicast group information, however, R2 on the branch 2 and the branch 3 is the edge node which advertises the multicast group information, R2 and R9 on the branch 4 are edge nodes which advertise the multicast group information, thus delete the information of the out interface connected to the node R10 from the node R7; finally, as shown in table 5, corresponding to the layer 3 multicast group G1, the out interface list on the node R7, after deleting, is the out interface 72.

TABLE 5

| the out interface list on the node R7 after traversing, which corresponds to the layer 3 multicast group G1 |
|---|
| Out interface 72 |

Assuming that, a terminal of a layer 3 multicast group G3 is attached under the edge node R4 and the edge node R9, and according to the multicast group information and the multicast group range that is supported by the first node, it is determined that the flooding tree corresponding to the layer 3 multicast group G3 is the flooding tree with R1 as the root, the node R4 traverses the node connected to each out interface of the out interface list, such as R1 and R9.

Specifically, R4 traverses the following branches:

branch 1: R9-R11; branch 2: R1-R2-R5-R8; branch 3: R1-R3-R6; and branch 4: R1-R2-R7-R10.

Where, all nodes on the above mentioned branch 2, branch 3 and branch 4 are not edge nodes which advertise the multicast group information, however, R9 on the branch 1 is the edge node which advertises the multicast group information, thus delete the information of the out interface connected to the node R1 from the node R4; finally, as shown in table 6 corresponding to the layer 3 multicast group G3, the out interface list on the node R4, after deleting, is the out interface 49.

TABLE 6

| the out interface list on the node R4 after traversing, which corresponds to the layer 3 multicast group G3 |
|---|
| Out interface 49 |

2067. After completing traversing the nodes connected to all the out interfaces in the out interface list, if there is only an out interface, which is connected to an upstream node, left in the out interface list, and the local node is not the edge node which advertises the multicast group information either, do not generate a multicast forwarding table corresponding to the layer 3 multicast group, otherwise generate the multicast forwarding table corresponding to the layer 3 multicast group according to the out interface list after traversing.

The multicast forwarding table is a union of local out interfaces and the above left out interface list, and a key is the multicast group IP.

In this embodiment, the multicast forwarding table corresponding to the layer 3 multicast group is an out interface list with the multicast group information as the index key.

Specifically, corresponding to the layer 3 multicast group G1:

After the traversing of the node R7, only an out interface connected to an upstream node, i.e., the out interface 72, is left in the out interface list, and the local node R7 is not a edge node which advertises the layer 3 multicast group information either, thus, the multicast forwarding table corresponding to the layer 3 multicast group is not generated.

After the traversing of the node R2, only an out interface connected to an upstream node, i.e., the out interface 21, is left in the out interface list, however, the local node R2 is the edge node which advertises the layer 3 multicast group information, and then, as shown in table 7, the multicast forwarding table corresponding to the layer 3 multicast group G1 is generated according to the out interface list after traversing.

TABLE 7

| the multicast forwarding table corresponding to the layer 3 multicast group G1, generated at the node R2 |
|---|
| Layer 3 multicast group G1 |
| Out interface 21 |
| Local out interface |

Specifically, corresponding to the layer 3 multicast group G3, only an out interface connected to a downstream node, i.e., the out interface 49, is left in the out interface list after the traversing of the node R4, and thus, as shown in table 8, the multicast forwarding table corresponding to the layer 3 multicast group G3 is generated according to the out interface list after traversing.

TABLE 8

| the multicast forwarding table corresponding to the layer 3 multicast group G3, generated at the node R4 |
|---|
| Layer 3 multicast group G3 |
| Out interface 49 |
| Local out interface |

It should be noted that according to the out interface information obtained after deleting in the above step 2066, a corresponding multicast forwarding table of a layer 3 multicast group can be generated corresponding to the layer 3 multicast group at each node. The above step 2066 is a preferable step, which can make it possible that when a multicast group and receivers attached to an edge node are located at the same side of the first node (namely the root of the flooding tree), multicast data sent from the multicast source to the receivers will be forwarded directly to the receivers via a converging point, and it is unnecessary to continue to duplicate the multicast data towards the first node direction, thereby saving the band width of the network. Specifically refer to the multicast forwarding table as shown in table 8, which is corresponding to the layer 3 multicast group G3 and generated at the node R4, according to the forwarding table shown in table 8, when a terminal of the layer 3 multicast group G3 attached to the node R9 is a multicast source, after the node R9 reports the multicast data to the node R4, the node R4 needs not to continue reporting this multicast data towards the first node R1, thereby saving the band width of the network.

Surely, the performing pruning, according to the layer 3 multicast group information, to the flooding tree corresponding to each layer 3 multicast group to generate a bidirectional multicast distribution tree, may be implemented by other ways, hereby detailed description is given by an example, however it will not be limited to the following example and it will not be enumerated hereby.

The specific example is as follows: generate a corresponding out interface list of a local node according to the flooding tree; according to each layer 3 multicast group corresponding to the flooding tree, traverse a node connected to each out interface in the out interface list; if the node connected to the out interface is a downstream node, and both this node and the downstream node of this node are not the edge node which advertises the multicast group information, then delete the out interface information of this out interface from the out interface list; after completing traversing all the nodes connected to all the out interfaces in the out interface list, if only the local out interface is left in the out interface list and if the local node is not the edge node which advertises the multicast group information, then do not generate the multicast forwarding table corresponding to the layer 3 multicast group, otherwise, generate, according to the out interface list after traversing, the multicast forwarding table corresponding to the layer 3 multicast group.

It should be noted that, after receiving a multicast group data packet, the edge node searches in the multicast forwarding table based on a multicast group address G, to obtain a corresponding out interface. During the forwarding process, for a multicast data packet, pruning function needs to be performed over a source port. Specifically, as shown in table 9, a data packet of multicast group G coming in from an out interface 1, can only be duplicated and forwarded to the other ports, i.e., an out interface 2 till an out interface N, and can not be forwarded again to the out interface 1 where the packet comes in.

TABLE 9

| Multicast group address G |
| --- |
| Out interface 1 |
| Out interface 2 |
| . . . |
| Out interface N |

In addition, during the process of forwarding the multicast group data packet, reverse path forwarding (reverse path forwarding, RPF) check needs to be performed, the packet can only come in from the out interface list, for example, in the above table the multicast data packet can only come in from the out interface 1, or the out interface 2, . . . , or the out interface N, and cannot come in from other interfaces, and if coming in from the other interfaces, the RPF check will fail, and the packet will be dropped.

In the method for creating a bidirectional multicast distribution tree based on an interior gateway protocol provided by the embodiments of the present invention, a shortest path to other node is generated with the first node as a source node according to the root address of the first node flooded by the first node through the IGP and according to the shortest path tree algorithm, a flooding tree is constructed according to the shortest path, and when layer 3 multicast group information flooded by an edge node through the IGP is received, a flooding tree corresponding to each layer 3 multicast group is determined according to the layer 3 multicast group information and the multicast group range that is supported by the first node, and then the flooding tree corresponding to each layer 3 multicast group is pruned according to the layer 3 multicast group information, to generate a bidirectional multicast distribution tree. The method realizes that a bidirectional multicast distribution tree is created based on the IGP, so that in the multipoint to multipoint multicast scenario, the IGP is adopted no matter whether multicast or unicast needs to be implemented, thereby simplifying the operation and maintenance of the protocol and solving the problem in the prior art that two sets of protocols which are an IGP unicast routing protocol and a PIM multicast routing protocol need to be operated and maintained simultaneously in the multipoint to multipoint multicast scenario and the operation and maintenance are complex.

Embodiment 3

Figure 3A:
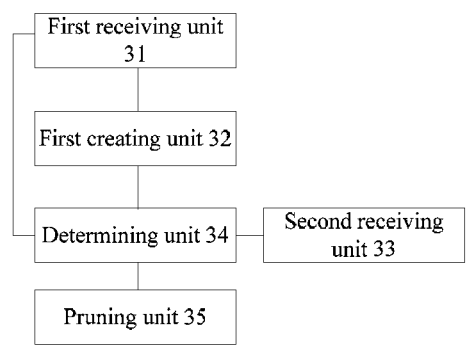
FIG. 3(a) is a first schematic structure diagram of a device for creating a bidirectional multicast distribution tree based on an IGP according to a third embodiment of the present invention.

The third embodiment of the present invention provides a device for creating a bidirectional multicast distribution tree based on an IGP, as shown in FIG. 3(a), which includes:

A first receiving unit 31, configured to receive a root address of a first node and a multicast group range that is supported by the first node, which are flooded by at least one first node through an IGP, where the first node is a node which is taken as a root of a flooding tree of an entire network; and for its specific implementing method, the description for step 101 as shown in FIG. 1(a) may be referred to, which will not be repeated hereby.

A first creating unit 32, configured to generate, according to the root address of the first node received by the first receiving unit and a shortest path tree algorithm, a shortest path to another node with the first node as a source node, and construct a flooding tree according to the shortest path; and for its specific implementing method, the description for step 102 as shown in FIG. 1(a) can be referred to, which will not be repeated hereby.

A second receiving unit 33, configured to receive layer 3 multicast group information flooded by an edge node through the IGP; for its specific implementing method, the description for step 103 as shown in FIG. 1(a) may be referred to, which will not be repeated hereby.

A determining unit 34, configured to, when the second receiving unit receives the layer 3 multicast group information flooded by the edge node through an IGP, determine, according to the layer 3 multicast group information and the multicast group range supported by the first node that is received by the first receiving unit, a flooding tree corresponding to each layer 3 multicast group; for its specific implementing method, the description for step 103 as shown in FIG. 1(a) may be referred to, which will not be repeated hereby.

Figure 3B:
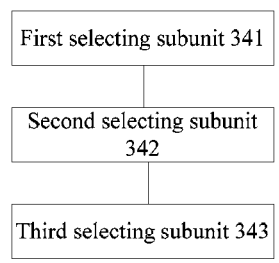
FIG. 3(b) is a schematic structure diagram of a determining unit in the device for creating a bidirectional multicast distribution tree based on an IGP as shown in FIG. 3(a)
Figure 3C:
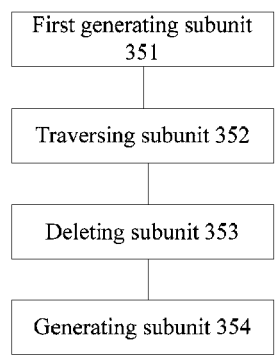
FIG. 3(c) is a schematic structure diagram of a pruning unit in the device for creating a bidirectional multicast distribution tree based on an IGP as shown in FIG. 3(a)
Figure 3D:
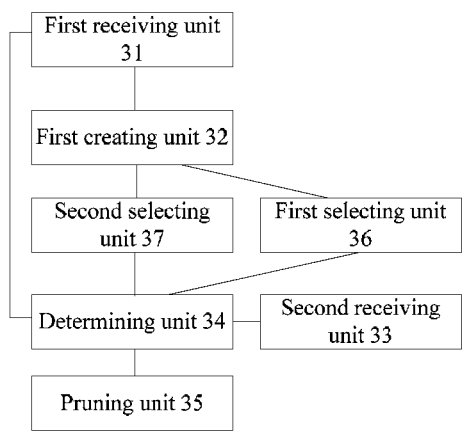
FIG. 3(d) is a second schematic structure diagram of the device for creating a bidirectional multicast distribution tree based on an IGP according to a third embodiment of the present invention.
Figure 3E:
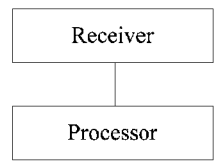
FIG. 3(e) is a second schematic structure diagram of a node device according to the third embodiment of the present invention.

In this embodiment, as shown in FIG. 3(b), the determining unit includes:

A first selecting subunit 341, configured to select, according to the layer 3 multicast group information and a multicast IP address range that is carried by the first nodes, a corresponding first node of the layer 3 multicast group; for the specific implementing method, the description for step 2061 as shown in FIG. 2(h) may be referred to, which will not be repeated hereby.

A second selecting subunit 342, configured to, if the first selecting subunit selects and obtains multiple first nodes covering a same multicast group, select, according to masks carried by the multiple first nodes, a first node with a longest mask from the multiple first nodes as the corresponding first node of the layer 3 multicast group covered by the multiple first nodes; for its specific implementing method the description for step 2062 as shown in FIG. 2(*h*) may be referred to, which will not be repeated hereby.

A third selecting subunit 343, configured to, if the second selecting subunit selects and obtains multiple first nodes with the longest mask, use a HASH algorithm to select one single node from the multiple first nodes with the longest mask as the corresponding first node of the layer 3 multicast group covered by the multiple first nodes with the longest mask. For its specific implementing method, the description for step 2063 as shown in FIG. 2(*h*) may be referred to, which will not be repeated hereby.

A pruning unit 35, configured to performing pruning, according to the layer 3 multicast group information, to the flooding tree corresponding to the each layer 3 multicast group determined by the determining unit, to generate a bidirectional multicast distribution tree. For its specific implementing method, the description for step 103 as shown in FIG. 1(*a*) may be referred to, which will not be repeated hereby.

In this embodiment, as shown in FIG. 3(*c*), the pruning unit includes:

A first generating subunit 351, configured to generate a corresponding out interface list of a local node according to the flooding tree; and for its specific implementing method, the description for step 2064 as shown in FIG. 2(*i*) may be referred to, which will not be repeated hereby.

A traversing subunit 352, configured to traverse a node connected to each out interface in the out interface list according to the each layer 3 multicast group corresponding to the flooding tree; and for its specific implementing method the description for step 2065 as shown in FIG. 2(*i*) may be referred to, which will not be repeated hereby.

A deleting subunit 353, configured to, if both the node connected to the out interface that is traversed by the traversing subunit and all node on a branch through which the node connected to the out interface recurses to a leaf node are not the edge node which advertises the multicast group information, then delete out interface information of the out interface from the out interface list; and for its specific implementing method the description for step 2066 as shown in FIG. 2(*i*) can be referred to, which will not be repeated hereby.

A generating subunit 354, configured to, after completing traversing all the nodes connected to all the out interfaces in the out interface list, if only an out interface connected to an upstream node is left in the out interface list and the local node is not the edge node which advertises the multicast group information either, not generate a multicast forwarding table corresponding to the layer 3 multicast group, otherwise, generate the multicast forwarding table corresponding to the layer 3 multicast group according to the out interface list after traversing. And for its specific implementing method, the description for step 2067 as shown in FIG. 2(*i*) may be referred to, which will not be repeated hereby.

Further, in order to avoid that the same multicast group packet is sent to the first node repeatedly, as shown in FIG. 3(*d*), the device further includes:

A first selecting unit 36, configured to, if a branch or a leaf node of the flooding tree created by the first creating unit has multiple parent nodes which reach the first node, select, according to attributes of the multiple parent nodes, one single node from the multiple parent nodes as a parent node for the branch or the leaf node to reach the first node. And for its specific implementing method, the description for step 104 as shown in FIG. 1(*b*) may be referred to, which will not be repeated hereby.

Where, the IGP is IS-IS, and an attribute of a parent node may include a system ID. Or the IGP is an OSPF protocol, and the attribute of the parent node may include a router ID.

Further, in order to avoid that the same multicast group packet is sent to a same node repeatedly, as shown in FIG. 3(*d*), the device further includes:

A second selecting unit 37, configured to, if there are multiple parallel links between two nodes of the flooding tree created by the first creating unit, select, according to attributes of the multiple parallel links, one single link from the multiple parallel links as the link between the two nodes. And for its specific implementing method, the description for step 105 as shown in FIG. 1(*b*) may be referred to, which will not be repeated hereby.

Where, the IGP is IS-IS, and an attribute of a parallel link may includes a circuit ID or a pseudo node ID, or the IGP is an OSPF protocol, and the attribute of the parallel link may include an IP address of an interface.

As shown in FIG. 3(*e*), an embodiment of the present invention also provides a node device, which includes:

A receiver, configured to receive a root address of a first node and a multicast group range that is supported by the first node, which are flooded by at least one first node through an IGP, where the first node is a node which is taken as a root of a flooding tree of an entire network; and further configured to receive layer 3 multicast group information flooded by an edge node through the IGP.

A processor, configured to generate, according to the root address of the first node received by the receiver and a shortest path tree algorithm, a shortest path to another node with the first node as a source node, and construct a flooding tree according to the shortest path; and further configured to, when the receiver receives the layer 3 multicast group information flooded by the edge node through the IGP, determine, according to the layer 3 multicast group information and the multicast group range that is supported by the first node, a flooding tree corresponding to the each layer 3 multicast group; and configured to perform pruning, according to the layer 3 multicast group information, to the flooding tree corresponding to each layer 3 multicast group determined by the determining unit to generate a bidirectional multicast distribution tree.

Further, in order to avoid that a same multicast group packet is sent repeatedly to the first node, the processor is further configured to, if a branch or a leaf node of the created flooding tree has multiple parent nodes which reach the first node, select, according to attributes of the multiple parent nodes, one single node from the multiple parent nodes as a parent node for the branch or the leaf node to reach the first node.

Where, when the IGP is IS-IS, an attribute of a parent node includes a system ID. When the IGP is an OSPF protocol, the attribute of the parent node includes a router ID.

Furthermore, in order to avoid that a same multicast group packet is sent to a same node repeatedly, the processor is further configured to, if there are multiple parallel links between two nodes of the created flooding tree, select, according to attributes of the multiple parallel links, one single link from the multiple parallel links as a link between the two nodes.

Where, when the IGP is IS-IS, an attribute of a parallel link includes a circuit ID or a pseudo node ID. And when the IGP is an OSPF protocol, the attribute of the parallel link includes an IP address of an interface.

Furthermore, the processor is specifically configured to:

select, according to the layer 3 multicast group information and a multicast IP address range that is carried by the first node, a corresponding first node of the layer 3 multicast group;

if there are multiple first nodes which cover the same multicast group, select, according to masks carried by the multiple first nodes, a first node with the longest mask from the multiple first nodes as the corresponding first node of the layer 3 multicast group covered by the multiple first nodes; and if there are multiple first nodes with the longest mask, use a HASH algorithm to select one single node from the multiple first nodes with the longest mask as the corresponding first node of the layer 3 multicast group covered by the multiple first nodes with the longest mask.

Furthermore, the processor is also specifically configured to:

generate a corresponding out interface list of a local node according to the flooding tree;

traverse a node connected to each out interface in the out interface list according to each layer 3 multicast group corresponding to the flooding tree;

if the node connected to the out interface traversed by the traversing subunit and all node on a branch through which the node connected to the out interface recurses to a leaf node, are not the edge node which advertises multicast group information, then delete out interface information of the out interface from the out interface list; and after completing traversing all the nodes connected to all the out interfaces in the out interface list, if only an out interface connected to an upstream node is left in the out interface list and the local node is not the edge node which advertises the multicast group information either, do not generate a multicast forwarding table corresponding to the layer 3 multicast group, otherwise generate the multicast forwarding table corresponding to the layer 3 multicast group according to the out interface list after traversing.

Corresponding to the device for creating a bidirectional multicast distribution tree based on an interior gateway protocol provided by the embodiment of the present invention, an embodiment of the present invention further provides a system for creating a bidirectional multicast distribution tree based on an interior gateway protocol, which includes: a first node, configured to flood, through an IGP, a root address of the first node and a multicast group range that is supported by the first node, where the first node is a node which is taken as a root of a flooding tree of an entire network; an edge node, configured to flood layer 3 multicast group information by the IGP; a normal node, configured to receive the root address of the first node and the multicast group range that is supported by the first node, which are flooded by the first node, generate, according to the root address of the first node and a shortest path tree algorithm, a shortest path to other node with the first node as a source node, and construct a flooding tree; where the normal node is further configured to, when receiving the layer 3 multicast group information flooded by the edge node, determine, according to the layer 3 multicast group information and the multicast group range that is supported by each first node, a flooding tree corresponding to each layer 3 multicast group, and performing pruning, according to the layer 3 multicast group information, to the flooding tree corresponding to each layer 3 multicast group, to generate a bidirectional multicast distribution tree.

The device, the node device and the system for creating a bidirectional multicast distribution tree based on an interior gateway protocol provided by the embodiments of the present invention, generate, according to a root address of a first node flooded by the first node through the IGP and according to the shortest path tree algorithm, a shortest path to another node with the first node as a source node, and construct a flooding tree according to the shortest path, and when receiving layer 3 multicast group information flooded by an edge node through IGP, determine, according to the layer 3 multicast group information and the multicast group range that is supported by the first node, a flooding tree corresponding to each layer 3 multicast group, and perform pruning, according to the layer 3 multicast group information, to the flooding tree corresponding to each layer 3 multicast group, so as to generate a bidirectional multicast distribution tree, thereby realizing creating the bidirectional multicast distribution tree based on the IGP, making it possible that, in the multipoint to multipoint multicast scenario, IGP is adopted no matter whether multicast or unicast needs to be implemented, simplifying the operation and maintenance of the protocol, and solving the problem in the prior art that two sets of protocols which are an IGP unicast routing protocol and a PIM multicast routing protocol need to be operated and maintained simultaneously in the multipoint to multipoint multicast scenario and the operation and maintenance are complex.

The method, the device and the system for creating a bidirectional multicast distribution tree based on an IGP provided by the embodiments of the present invention, may be applied to the multipoint to multipoint multicast scenario.

Persons of ordinary skill in the art may understand that all or a part of the steps of the methods according to embodiments of the present invention may be implemented by a program instructing relevant hardware. The program may be stored in a computer readable storage medium, such as ROM/RAM, a magnetic disk, or an optical disk.

The aforementioned is merely intended for describing the specific embodiments of the present invention; however the protection scope of the present invention will not be limited to this. Any change or substitution which can be easily conceived by the technical persons familiar with the art within the technical scope of the present invention, will fall within the protection scope of the present invention. Therefore, the protection scope of the present invention should subject to the accompanying claims.

What is claimed is:

1. A method for creating a bidirectional multicast distribution tree based on an interior gateway protocol (IGP), comprising:
   receiving, by a local node, a root address of a first node and a multicast group range supported by the first node, wherein the root address of the first node and the multicast group range supported by the first node are flooded using the IGP;
   generating, based on the root address of the first node and a shortest path tree algorithm, a shortest path to another node with the first node as a source node;
   constructing, based on the shortest path, a flooding tree for a network with the first node being a root of the flooding tree for the network;
   receiving layer 3 multicast group information flooded by an edge node using the IGP;

determining, based on the layer 3 multicast group information and the multicast group range supported by the first node, a flooding tree corresponding to a layer 3 multicast group; and performing pruning, based on the layer 3 multicast group information, on the flooding tree corresponding to the layer 3 multicast group, to generate a bidirectional multicast distribution tree, wherein performing the pruning comprises:

generating, based on the flooding tree for the network, an out interface list of the local node;

traversing, based on each layer 3 multicast group corresponding to the flooding tree for the network, a node connected to each out interface in the out interface list;

if both the node connected to the out interface and all nodes on a branch through which the node connected to the out interface recurses to a leaf node are not an edge node which advertises multicast group information, deleting out interface information of the out interface from the out interface list; and after traversing all the nodes connected to all the out interfaces in the out interface list, if there is only an out interface, which is connected to an upstream node, left in the out interface list, and if the local node is not the edge node which advertises the multicast group information, not generating a multicast forwarding table corresponding to the layer 3 multicast group, or otherwise generating the multicast forwarding table corresponding to the layer 3 multicast group according to the out interface list after the traversing.

2. The method according to claim 1, wherein after generating the shortest path, the method further comprises:

if a branch or a leaf node of the flooding tree for the network has multiple parent nodes which reach the first node, selecting, based on attributes of the multiple parent nodes, one single node from the multiple parent nodes as a parent node for the branch or the leaf node to reach the first node.

3. The method according to claim 2, wherein when the IGP is an intermediate system to intermediate system routing selection protocol (IS-IS), an attribute of the parent node comprises a system identifier (ID).

4. The method according to claim 2, wherein when the IGP is an open shortest path first (OSPF) protocol, an attribute of the parent node comprises a router identifier (ID).

5. The method according to claim 1, wherein after generating the shortest path, the method further comprises:

if there are multiple parallel links between two nodes of the flooding tree for the network, selecting, based on attributes of the multiple parallel links, one single link from the multiple parallel links as a link between the two nodes.

6. The method according to claim 5, wherein when the IGP is an intermediate system to intermediate system routing selection protocol (IS-IS), an attribute of the parallel link comprises a circuit identifier (ID) or a pseudo node ID.

7. The method according to claim 5, wherein when the IGP is an open shortest path first (OSPF) protocol, an attribute of the parallel link comprises an Internet Protocol (IP) address of an interface.

8. The method according to claim 1, wherein the multicast group range supported by the first node comprises a multicast Internet Protocol (IP) address supported by the first node and a mask corresponding to the multicast IP address; and wherein determining the flooding tree corresponding to the layer 3 multicast group comprises:

selecting, based on the layer 3 multicast group information and the multicast IP address range supported by the first node, a corresponding first node for the layer 3 multicast group.

9. A system for creating a bidirectional multicast distribution tree based on an interior gateway protocol (IGP), comprising:

a first node, configured to flood, using the IGP, a root address of the first node and a multicast group range supported by the first node;

an edge node, configured to flood layer 3 multicast group information using the IGP;

a local node, configured to:

receive the root address of the first node and the multicast group range supported by the first node flooded by at least one first node, generate, based on the root address of the first node and a shortest path tree algorithm, a shortest path to a third node with the first node as a source node, and construct a flooding tree for a network based on the shortest path;

wherein the local node is further configured to:

receive layer 3 multicast group information flooded by the edge node, determine, based on the layer 3 multicast group information and the multicast group range supported by the first node, a flooding tree corresponding to a layer 3 multicast group, and perform pruning, based on the layer 3 multicast group information, on the flooding tree corresponding to the layer 3 multicast group, to generate a bidirectional multicast distribution tree, wherein performing the pruning comprises:

generating, based on the flooding tree for the network, an out interface list of the local node;

traversing, based on each layer 3 multicast group corresponding to the flooding tree for the network, a node connected to each out interface in the out interface list;

if both the node connected to the out interface and all nodes on a branch through which the node connected to the out interface recurses to a leaf node are not an edge node which advertises multicast group information, deleting out interface information of the out interface from the out interface list; and after traversing all the nodes connected to all the out interfaces in the out interface list, if there is only an out interface, which is connected to an upstream node, left in the out interface list, and if the local node is not the edge node which advertises the multicast group information, not generating a multicast forwarding table corresponding to the layer 3 multicast group, and otherwise generating the multicast forwarding table corresponding to the layer 3 multicast group according to the out interface list after the traversing.

10. The method according to claim 8, wherein if there are multiple first nodes which cover a same multicast group, selecting the corresponding first node further comprises:

selecting, according to masks carried by the multiple first nodes, a node with a longest mask from the multiple first nodes as the corresponding first node of the layer 3 multicast group; and wherein if there are multiple first nodes with the longest mask, selecting the corresponding first node further comprises: using a HASH algorithm to select one single node from the multiple first nodes with the longest mask as the corresponding first node of the layer 3 multicast group.

11. A non-transitory, processor-readable medium having processor-executable instructions stored thereon for creating a bidirectional multicast distribution tree based on an interior gateway protocol (IGP), the processor-executable instructions, when executed by a processor, facilitating the performance of the following:

receiving, by a local node, a root address of a first node and a multicast group range supported by the first node, wherein the root address of the first node and the multicast group range supported by the first node are flooded using the IGP;

generating, based on the root address of the first node and a shortest path tree algorithm, a shortest path to another node with the first node as a source node;

constructing, based on the shortest path, a flooding tree for a network with the first node being a root of the flooding tree for the network;

receiving layer 3 multicast group information flooded by an edge node using the IGP;

determining, based on the layer 3 multicast group information and the multicast group range supported by the first node, a flooding tree corresponding to a layer 3 multicast group; and performing pruning, based on the layer 3 multicast group information, on the flooding tree corresponding to the layer 3 multicast group, to generate a bidirectional multicast distribution tree, wherein performing the pruning comprises:

generating, based on the flooding tree for the network, an out interface list of the local node;

traversing, based on each layer 3 multicast group corresponding to the flooding tree for the network, a node connected to each out interface in the out interface list;

if both the node connected to the out interface and all nodes on a branch through which the node connected to the out interface recurses to a leaf node are not an edge node which advertises multicast group information, deleting out interface information of the out interface from the out interface list; and after traversing all the nodes connected to all the out interfaces in the out interface list, if there is only an out interface, which is connected to an upstream node, left in the out interface list, and if the local node is not the edge node which advertises the multicast group information, not generating a multicast forwarding table corresponding to the layer 3 multicast group, or otherwise generating the multicast forwarding table corresponding to the layer 3 multicast group according to the out interface list after the traversing.

12. The non-transitory processor-readable medium according to claim 11, wherein the processor-executable instructions, when executed by a processor, further facilitate performance of the following:

after generating the shortest path, if a branch or a leaf node of the flooding tree for the network has multiple parent nodes which reach the first node, selecting, based on attributes of the multiple parent nodes, one single node from the multiple parent nodes as a parent node for the branch or the leaf node to reach the first node.

13. The non-transitory processor-readable medium according to claim 12, wherein when the IGP is an intermediate system to intermediate system routing selection protocol (IS-IS), an attribute of the parent node comprises a system identifier (ID).

14. The non-transitory processor-readable medium according to claim 12, wherein when the IGP is an open shortest path first (OSPF) protocol, an attribute of the parent node comprises a router identifier (ID).

15. The non-transitory processor-readable medium according to claim 11, wherein the processor-executable instructions, when executed by a processor, further facilitate performance of the following:

after generating the shortest path, if there are multiple parallel links between two nodes of the flooding tree for the network, selecting, based on attributes of the multiple parallel links, one single link from the multiple parallel links as a link between the two nodes.

16. The non-transitory processor-readable medium according to claim 15, wherein when the IGP is an intermediate system to intermediate system routing selection protocol (IS-IS), an attribute of the parallel link comprises a circuit identifier (ID) or a pseudo node ID.

17. The non-transitory processor-readable medium according to claim 15, wherein when the IGP is an open shortest path first (OSPF) protocol, an attribute of the parallel link comprises an Internet Protocol (IP) address of an interface.

18. The non-transitory processor-readable medium according to claim 11, wherein the multicast group range supported by the first node comprises a multicast Internet Protocol (IP) address supported by the first node and a mask corresponding to the multicast IP address; and wherein determining the flooding tree corresponding to the layer 3 multicast group comprises:

selecting, based on the layer 3 multicast group information and the multicast IP address range supported by the first node, a corresponding first node for the layer 3 multicast group.

* * * * *